Sept. 2, 1952  V. H. PAVLECKA ET AL  2,608,822
METHOD OF OPERATION AND REGULATION OF THERMAL POWER PLANTS
Filed Oct. 7, 1944  2 SHEETS—SHEET 1
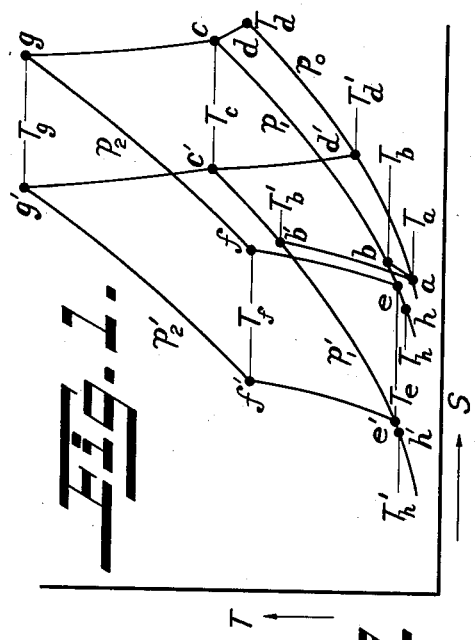
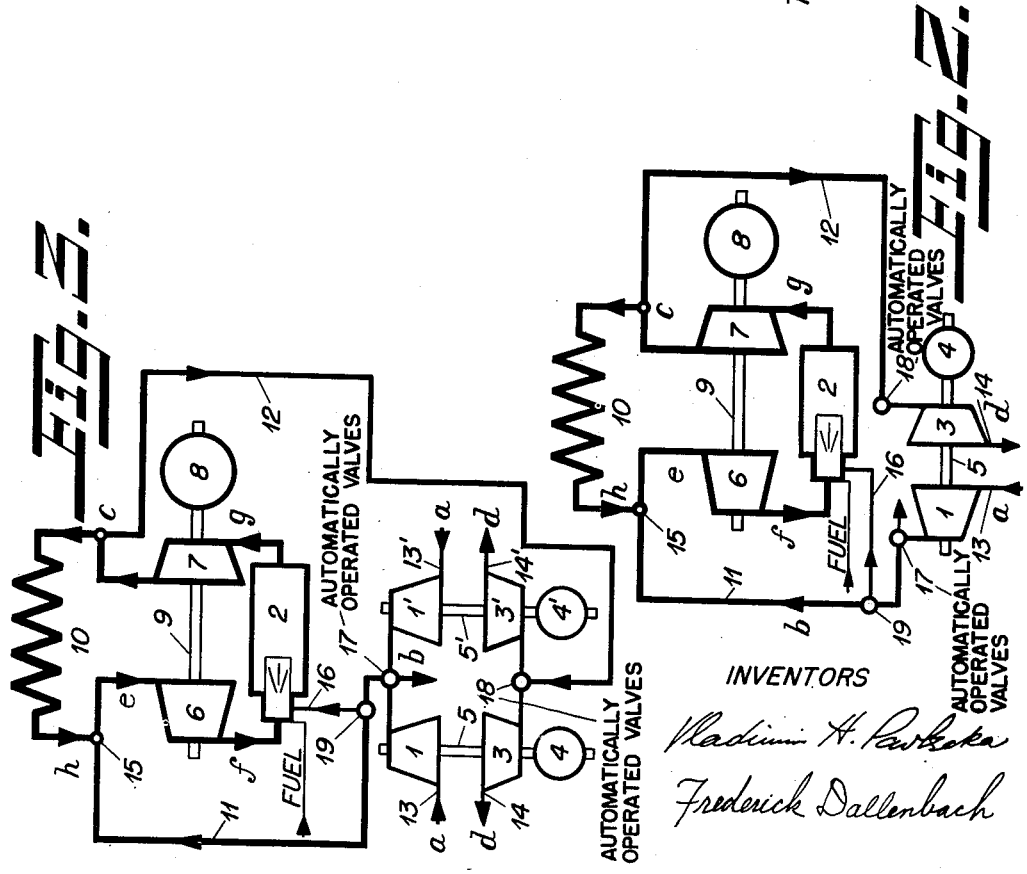
INVENTORS
Vladimir H. Pavlecka
Frederick Dallenbach Patented Sept. 2, 1952

2,608,822

UNITED STATES PATENT OFFICE 2,608,822

METHOD OF OPERATION AND REGULATION OF THERMAL POWER PLANTS

Vladimir H. Pavlecka, Pacific Palisades, and Frederick Dallenbach, Inglewood, Calif., assignors to Turbolectric Corporation, Beverly Hills, Calif., a corporation of California Application October 7, 1944, Serial No. 557,654

11 Claims. (Cl. 60—39.03)

This invention relates to gas turbine power plants, and more particularly to the method of operation of such plants at substantially constant temperature irrespective of load variations, whereby the thermal efficiency of the plant is maintained constant. The invention also relates to a novel method of starting power plants of the above type.

The subject of this invention is a basic improvement in the application of the simple Joule thermodynamic cycle, also known as the Brayton cycle, to the continuous combustion gas turbines.

The Joule cycle, operating at substantially constant pressure during combustion, is not well adapted to power plants required to run at constant speed of rotation while the load demand on the turbine may vary. This condition arises whenever it is desired to operate a gas turbine power plant as a prime mover for electric alternators, synchronously connected to a constant frequency electrical network, or on ships in the propulsion with controllable pitch propellers.

Still another deficiency of the simple Joule cycle is its inability to sustain overloads without increase of the maximum cycle temperature, which is altogether undesirable from the standpoint of strength and endurance of the turbine. This limitation constitutes a serious drawback to the application of continuous combustion turbines to transportation, for instance in locomotives.

If the load demand on a combustion turbine, operating according to the simple Joule cycle, is changed at constant speed, for example diminished, the maximum temperature of the cycle has to be decreased by reducing the rate of the fuel consumption. The effect of this change is to cut down the heat drop in the turbine, while the heat rise in the compressor remains approximately constant and the difference of these two energy conversions, the useful mechanical energy, is thereby reduced to correspond to the decreased load demand.

These changes in the cycle bring about a rapid deterioration of the cycle efficiency, an undesirable characteristic of the simple Joule cycle, unless the other variable in the power output equation, viz., the mass of the elastic fluid flowing through the cycle, be varied instead of the useful heat head. This latter consideration is indeed a sound one because while the change in the useful heat head at constant speed of rotation of the machines violates the laws of dynamic similarity of turbo machines and causes a deterioration of thermal efficiency, the change in the amount of mass of air operating within the cycle, on the other hand, does not affect in any way the thermodynamic processes and laws of dynamic similarity of the machines. The thermal efficiency of the cycle remains therefore, constant regardless of how much mass or weight of air is operating in the cycle.

The disclosed invention provides a method of achieving a complex thermodynamic cycle of constant thermal efficiency under variable loads, by functionally varying the mass density of the operating elastic fluid of the cycle with the load and in proportion to it. In essence, the invention provides for a dual or twin Joule cycle; one, a high pressure and constant compression ratio power cycle, called by us hereinafter the principal cycle, connected on its low pressure side to the high pressure side of a second, low pressure and variable compression ratio cycle, called hereinafter the balancing cycle, based on the atmospheric pressure and temperature.

The invention provides for a variable power output of the high pressure principal cycle with all cycle temperatures, including the entry and exit temperatures of the compressor as well as the entry and exit temperatures of the turbine, held constant under all conditions of load demand, the density of the elastic fluid in this cycle being determined by the controlling manipulations of the low pressure, variable compression ratio, balancing cycle.

The constancy of the temperatures between which the principal cycle operates at all loads means that the thermal efficiency of this cycle is also constant throughout the whole range of loads. The thermal efficiency of the balancing cycle is a variable, being a function of the load on the principal cycle. Since however, the power output of the balancing cycle is only a fraction of the output of the principal cycle, the net effect of this variation on the overall efficiency of the complete power plant is negligible and the combined thermal efficiency of both cycles, when taken together, remains substantially constant at all loads.

The method of realization of this desired performance consists of operating simultaneously and inter-dependently two sets of turbo machines or other thermal prime movers. The smaller of the two machines is composed by way of example, of an electric machine on a common shaft with a low pressure compressor and with a low pressure turbine.

This aggregate, called hereinafter the balancing machine set, can rotate at variable speed functionally determined by the external useful load produced by the principal cycle. The low pressure compressor of the balancing machine set supplies fresh combustion air to the low pressure side of the larger, high pressure and preferably constant speed machine, generating externally useful power, and composed by way of example, of a principal turbine, a principal compressor and a power consumer, the whole aggregate called hereinafter the principal machine set, and the low pressure turbine of the balancing machine set obtains from the low pressure side of the principal cycle machine set a proportional amount of a mixture of hot air and burned gases for the propulsion of the balancing machine set. All combustion of fuel, either liquid, or gaseous, or powdered takes place at the highest pressure of the high pressure cycle, there being only one combustion heat generator in general, in the whole system, although more may be used, if so desired.

The rate of rotation of the balancing machine set determines the rate of supply of fresh air to the principal machine set and the pressure level and therefore, also the mass density of the mixture of air and gases, composing the elastic motive fluid with which the principal machine set is caused to operate.

The rate of supply of fresh air to the principal machine set also determines the rate of fuel consumption of and together with the level of the mass density of the elastic fluid, the power developed by the principal cycle. The operational coordination of the two machine sets, the balancing as well as the principal machine set, is accomplished by suitable controlling and regulating inter-connections between them; the method and means of regulation and control being the subject of the copending application Serial No. 301,224, filed July 28, 1952, although as will be explained further on, this regulation or balancing tends to become automatic, even without elaborate instrumentation.

Among the objects of this invention can be noted the desire to maintain a consistently high overall thermal efficiency of continuous combustion gas turbo plants at constant speed of rotation during all variations of useful load demand; this is of paramount importance in electric power generation where it is always necessary to maintain a constant frequency of electric current, in phase with the rest of an electrical distributing system, regardless of the magnitude of the load. So far, the continuous combustion turbine has not been able to accomplish this without a major sacrifice in its overall thermal efficiency at all loads excepting near and at the designed output.

Another object of the invention is to provide a power plant in which high power overloads can be safely practiced without fear of endangering the strength of the essential components of the turbine of the principal machine set and rapidly deteriorating the durability of these parts by high temperatures; since the overload is manifested in the case of the disclosed combustion gas turbine power plant as an increase of torque and not as an increase of speed, it holds particular attraction for transportation, where the problem of starting large resistances into motion has always been somewhat of a difficulty for all turbines.

Another object of the invention is to automatically maintain all determining temperatures of the principal cycle constant at all loads.

Another object of the invention is to provide an extremely compact and light weight power plant for very large powers, particularly suitable for transportation use, in locomotives and especially in ships; the invention makes possible gas turbine power plants of light weight and great compactness, uncommon even among the turbo machines.

Another object of the invention is to provide superior conditions for combustion in two respects, viz., by carrying out combustion at high pressures, even up to by way of example, approx. 100 atmospheres, of the motive elastic fluid, higher than ever reached before in continuous combustion gas turbines. The physico-chemical knowledge of combustion at high pressures recognizes burning at elevated pressures as superior to combustion at low pressure levels for reasons explainable by the kinetic theory of gases and also by test results. Furthermore, by maintaining combustion in an elastic fluid medium composed of a mixture of air and of burned gases at high temperature, such as carbon dioxyde and water vapor, the latter being a particularly potent catalyzer in the oxydizing reactions of fuel burning, the rate of combustion is known to be greater than when burning takes place in pure air.

Still another object of this invention is to reduce the size of the intake and exhaust ducts to the smallest possible minimum. It is preferable to mechanize the dual cycle with high pressure machines which, in general, can operate without heat recuperators and still produce high thermal cycle efficiencies. In this connection reference is made to the copending application Serial No. 557,655, being filed concurrently with this application and the copending applications Serial No. 179,028, filed August 12, 1950, and Serial No. 228,166, filed May 25, 1951, all dealing with the high compression ratio turbo machines, especially suitable for the embodiment of this invention. The principal cycle in its preferred embodiment using high compression ratio machines is capable of getting along with only one heat exchanger, operating always at relatively high pressures and never with the full amount of the total weight flow of the motive elastic fluid circulating in the ducting comprising the principal cycle circuit. The balancing cycle in its preferred embodiment incorporating the high compression ratio turbo machines according to the referenced copending applications, broadens the operational versatility of the principal cycle beyond any limit possible with low compression ratio machinery.

It is to be understood that although the use of high compression ratio machinery constitutes the preferred embodiment of the dual cycle invention, as described and shown in this specification, the invention can be also successfully practiced with low compression ratio machinery with the aid of heat recuperators which are not specifically described and shown here, but are described more fully in the application Serial No. 301,224, filed July 28, 1952. Still another principal object of the invention is to facilitate starting of large output, high pressure combustion turbines by novel electro-pneumatic means.

The novel features which are believed to be characteristic of the invention, both as to its organization and method of operation, together with further objects and advantages thereof, will be better understood from the following description considered in connection with the accompanying drawings in which several embodiments of the invention are illustrated by way of an example. It is to be expressly understood, however, that the drawings are for the purpose of illustration and description only, and are not intended as a definition of the limits of the invention.

Fig. 1 is an entropy cycle of the principal and auxiliary turbines;

Fig. 2 is a schematic diagram of the power plant;

Figs. 3 and 4 are schematic diagrams of the power plant illustrated in Fig. 1 but having two auxiliary compressor-turbine sets connected in parallel with each other in Fig. 3, and in series in Fig. 4.

Figure 4:
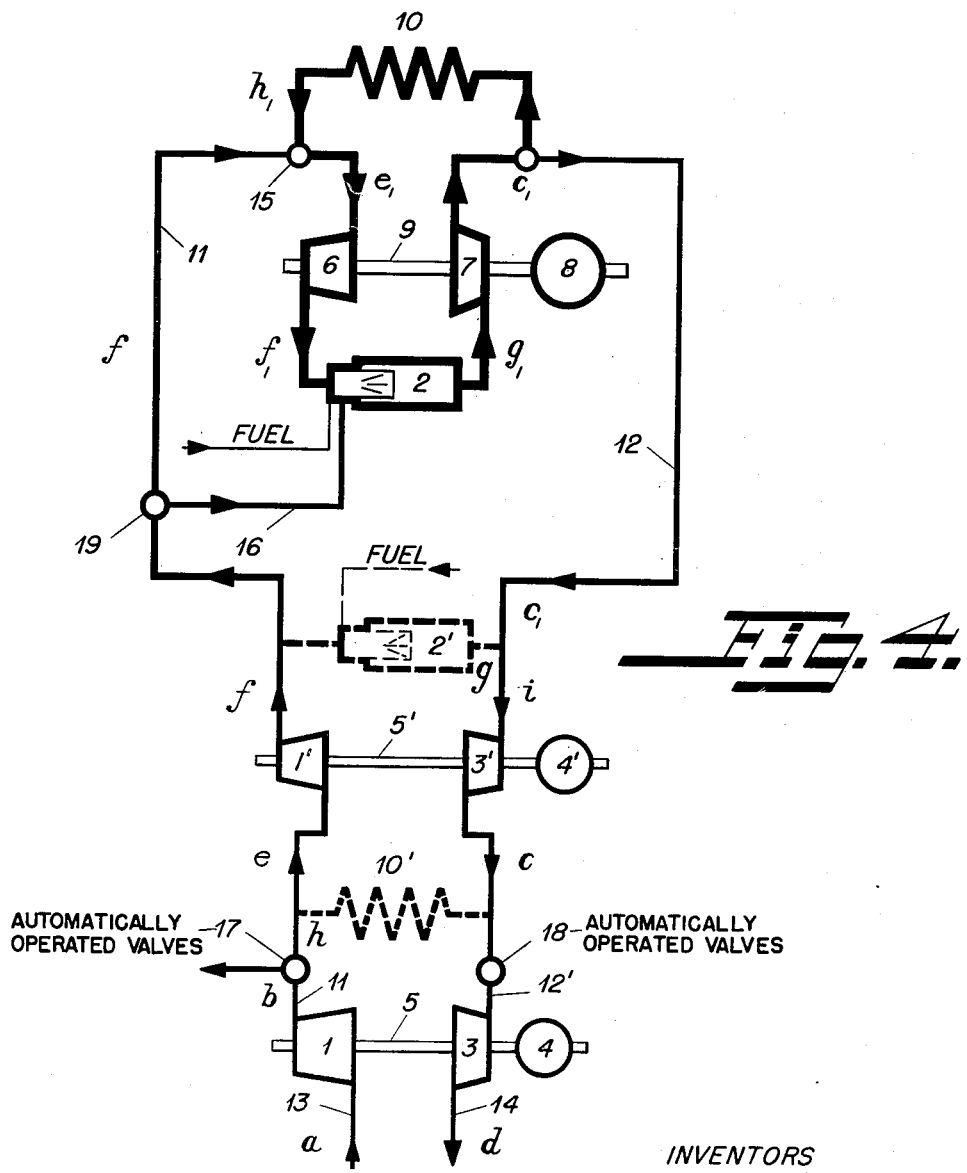

The features and characteristics of the dual cycle, which constitutes an improvement over the simple Joule cycle, can best be seen on the T—S chart in Fig. 1, and in the schematic layout of the machines operating according to this dual cycle, in Fig. 2. Both of these figures are so marked at various determining points of the cycle that corresponding locations in the two diagrams are designated by identical small letters of the alphabet.

In Fig. 1 and Fig. 2, the points on the cycle shown on the T—S chart as well as on the schematic diagram of the circuit respectively, designated by letters $e$, $f$, $g$, $c$, demarcate the high pressure cycle called here the principal cycle, producing useful power. The operation of this cycle is carried out in succession by the compressor 6, drawing air at thermodynamic state $e$, at temperature $T_e$ and pressure $p_1$, and compressing it to a state $f$, at temperature $T_f$ and pressure $p_2$, raising the heat energy of air by an amount defined by the temperature difference $(T_f - T_e)$. The compressed air enters the combustion heat generator 2, in which burning fuel, liquid, gaseous or powdered, raises its temperature at substantially constant pressure $p_2$ to state $g$, at temperature $T_g$, thereby increasing the heat energy of air by an amount defined by the temperature difference $(T_g - T_f)$. The mixture of air and burned gases enters the turbine 7 from the heat generator 2 at temperature $T_g$ and pressure $p_2$ and expands in it to thermodynamic state $c$, at temperature $T_c$ and back to pressure $p_1$, thereby converting an amount of heat energy, defined by the temperature difference $(T_g - T_c)$, into mechanical energy, a portion of which drives the power consumer or converter, e. g., an electric alternator 8, mounted on a common shaft 9 with the air compressor 6 and gas turbine 7. After leaving the turbine at point $c$, the flow of the mixture of air and burned gases, G in kgs./sec., is divided into two streams. The larger portion of the circulating flow, approx. ¾G to ⅘G, or from 60% to 85% of the exhaust gases appearing in the exhaust of the main turbine 7, by way of example, depending upon the maximum cycle temperature $T_g$, is ducted into the cooling heat exchanger 10, wherein the gaseous mixture is cooled to a thermodynamic state designated by point $h$, at temperature $T_h$ and at substantially constant pressure $p_1$. The smaller portion of the flow of the mixture, approx. ¼G to ⅕G, of the total mass of the elastic motive fluid, circulating through the principal machine set 6, 7, 8 or from 40% to 15% of the exhaust gases appearing in the exhaust of the main turbine 7, is ducted by conduit 12 to the turbine 3, of the balancing machine set 1, 3, 4. In the balancing turbine 3, the mixture of air and burned gases is expanded from thermodynamic state $c$, to state $d$, at temperature $T_d$ and atmospheric pressure $p_0$, thereby converting an amount of heat energy, defined by temperature difference $(T_c - T_d)$, into mechanical energy; the expanded gases are discharged into the atmosphere by duct 14. The balancing turbine 3 drives on a common shaft 5, the low pressure or balancing compressor 1 and an electric machine 4. The balancing compressor 1 draws air either in atmospheric or pre-compressed state, through intake duct 13, at temperature $T_a$ and at ambient pressure $p_0$, corresponding to thermodynamic state designated by point $a$, and compresses it to pressure $p_1$ and temperature $T_b$, corresponding to thermodynamic state designated by point $b$, on the low pressure isobar $p_1$, of the principal cycle $e$, $f$, $g$, $c$, increasing thereby the heat energy of the air by an amount defined by a temperature difference $(T_b - T_a)$. It is to be noted that by having a common isobar $p_1$, the low pressure balancing cycle $a$, $b$, $c$, $d$, and the high pressure principal cycle $e$, $f$, $g$, $c$, are thereby mutually interconnected physically and thermodynamically.

The compressed air arriving from the balancing compressor 1, is ducted by conduit 11, to point 15 in the principal cycle circuit at which the return conduit from the cooling heat exchanger 10 is joined. Since the fresh air arriving into the principal cycle $e$, $f$, $g$, $c$, is by way of example, at a higher temperature $T_b$, than the gaseous mixture cooled down to temperature $T_h$ in the cooling heat exchanger 10, a mixing process at substantially constant pressure $p_1$ takes place between the thermodynamic state $h$ of the gaseous mixture and state $b$ of the incoming air, until an equilibrium temperature $T_e$ is reached substantially at constant pressure $p_1$, before the entry to the principal compressor 6 at thermodynamic state designated by point $e$.

The principal cycle could operate equally well, as far as the principles of this invention are concerned, if the point designating the thermodynamic state $b$, at which the fresh air enters the principal cycle, were located at a lower temperature than that corresponding to the point $e$, Fig. 1, at which the high pressure compression begins. Such an arrangement would result in a smaller heat exchanger 10 than before with $T_b > T_e$, however at a cost of decrease of overall efficiency of the principal cycle. It may be expedient at times to favor a slightly smaller heat exchanger 10 and accept a lower overall cycle efficiency. The scope of our invention is therefore, not limited to a definite relation between temperature $T_b$ and $T_h$, but includes all feasible and practical temperature relations.

The amount of fresh air $G_1$ kgs./sec., drawn in by the low pressure, balancing compressor 1 and delivered into the principal cycle $e$, $f$, $g$, $c$, need not be more than is theoretically required for perfect combustion of fuel in the heat generator 2. This is possible only in our dual cycle, because at all times and under all conditions of load, there will always be present a sufficient amount of excess air in the heat generator 2 to maintain perfect and complete burning of fuel. In order that no possibility may arise of supplying fuel at a greater rate than at which the fresh air is being replenished, it is preferable to set the value of $G_1$ kgs./sec. at approx. $G_1 = 1.05 \times$ (the minimum amount of air required for combustion), although it may be a good practice to use much greater coefficient, say up to 1.25 in normal practice and even more under special conditions. It is preferable to keep the amount of fresh, renovating air entering the cycle, at the practical minimum in order to operate with as small a balancing machine set as possible, for reasons of sensitivity of control and in order to secure rapid response to regulating impulses.

The overall efficiency of the dual cycle as described, can be expressed by the simplified relation:

$$\eta_{th} = \left[\frac{(T_g - T_c) - (T_f - T_e)}{(T_g - T_f)}\right] + \frac{G_1}{G}\left[\frac{(T_c - T_d) - (T_b - T_a)}{(T_g - T_f)}\right]$$

From this expression it can be seen that the first bracketed term is a constant for a given machine, because it is a part of the specification of this invention that all the limit temperatures of the principal cycle must never change, while the second bracketed term is in general, a variable, because it is a part of the specification of this invention to vary the temperatures $T_b$ and $T_a$ of the balancing cycle. It is clear that the second term should always be very small in order to maintain a substantially constant overall thermal efficiency $\eta_{th}$, of the dual cycle. This is relatively easy to satisfy, because the bracketed term is always small, while the value $G_1$ kgs./sec. is deliberately kept low for reasons already noted.

The state of equilibrium of the dual cycle as described hereinabove, corresponds to a definite load demand on the principal power consumer or converter 8, and the whole dual cycle may be assumed balanced with respect to and in equilibrium with this load demand, all machines running in equilibrium, at constant speed and both, the balancing machine set as well as the principal machine set operating at uniform, constant compression ratios.

If now the principal machine set 6, 7, 8, is called upon, even suddenly, to deliver an increased power at constant speed of rotation to either an electric network or to a locomotive or to a controllable pitch propeller, the regulating and balancing devices subject of the copending application already referenced hereinabove, cause the balancing electric machine 4 to accelerate as an electric motor, the balancing compressor 1 and the turbine 3, from a rotational speed $n_0$, heretofore constant, to a higher rotational speed $n_1$. At the beginning of the acceleration, the rate of fuel supply to the heat generator 2 also begins to increase and simultaneously, the valve 18, located in the conduit 12 at entry to the turbine 3, is forced by governing and controlling means, to close, thereby blocking off either partially or completely, depending upon the severity of the load demand impulse, the flow of gaseous mixture from the principal cycle at thermodynamic state designated by point c, into the low pressure balancing turbine 3, during the period of acceleration of the balancing machine set 1, 3, 4. This maneuver will, in effect rapidly increase the pressure $p_1$ to a higher pressure $p'_1$, at the discharge point of the balancing compressor 1, raising the temperature of the fresh air to $T'_6$, at point $b'$, Fig. 1. Thus by speeding up the balancing machine set 1, 3, 4, the principal cycle is not only being supplied with fresh replacing air at a greater rate than before, but the principal cycle itself is being displaced by this new set of conditions, into a new location on the T—S chart, in the direction of higher pressures, designated by position points $e'$, $f'$, $g'$, $c'$. The highest cycle pressure thereby increases from $p_2$ to $p'_2$, but the pressure ratio $p'_2/p'_1$, remains constant and equal at all times, to the pressure ratio $p_2/p_1$, since the temperature ratios of any two temperatures of limiting points of the principal cycle $e$, $f$, $g$, $c$, remain always constant at all densities of the elastic motive fluid, at which the principal cycle may operate or in other words, regardless of the position of the principal cycle on the T—S chart. This inter-relation is the result of dynamic similarity laws, that can be derived from the fundamental Laplace's relations:

$$\eta_c\left[\frac{T_f}{T_e} - 1\right] = \left(\frac{p_2}{p_1}\right)^{\frac{K-1}{K}} - I = \text{Constant}$$

$$\frac{1}{\eta_t}\left[1 - \frac{T_c}{T_g}\right] = 1 - \left(\frac{p_1}{p_2}\right)^{\frac{K-1}{K}} = \text{Constant}$$

Therefore, the conditions of constant pressure ratio of the high pressure, principal cycle are automatically satisfied when the temperatures of that cycle are maintained constant at all points on the T—S chart. As soon as the equilibrium with the increased power demand of the energy consumer or converter 8 has been established, valve 18 again fully opens, connecting the hot gas conduit 12 to the entry of balancing turbine 3, resuming a continuous flow of that amount $G_1'$ kgs./sec. of the mixture of air and burned gases that are being purged from the principal cycle $e'$, $f'$, $g'$, $c'$, by fresh air from the balancing compressor 1 at a new, higher pressure $p'_1$ but a constant compression ratio $p'_2/p'_1$, for the duration of the new load demand on the principal machine set.

It can be seen that the desired end, viz., to attain a variation of the weight flow G kgs./sec. through the principal cycle, has been achieved by a change of the mass density of the working elastic fluid medium in the principal cycle. The limit of usefulness of this method is set only by the speed limit of the balancing machine set 1, 3, 4, which as has been pointed out already, for reasons of small amount of fresh air that has to be replenished, will always be small in size and can therefore, not only accelerate and decelerate rapidly, but can also reach high speeds of rotation and consequently, high pressure ratios.

In the reverse direction, i. e., if there is a need for a decrease, even a sudden one, of external power on the principal machine set 6, 7, 8, the required regulating devices described in the copending application referenced hereinabove, diminish the amount of fuel that is being supplied to the heat generator 2, at the same time automatically closing off the air conduit 11, either completely or partially by the closure of valve 17 located near or on the stator of balancing compressor 1, and simultaneously opening the exit of the balancing compressor 1 to the atmosphere.

During this controlling procedure, the gas valve 18 in conduit 12 remains fully open and the balancing turbine 3 keeps on delivering useful torque to the electric machine 4, operating it now as an electric generator, since the compressor 1 is unloaded except for its inherent losses. The pressure level of the common isobar $p'_1$ of the two cycles, mutually inter-connected, is quickly reduced, the mass density of the gaseous mixture in the principal cycle $e'$, $f'$, $g'$, $c'$, is diminshed and the torque on the principal machine set 6, 7, 8, is thereby decreased, without any change of the rotational speed of the principal machine set 6, 7, 8, because the heat rise determined by $(T_f - T_e)$ and the heat drop determined by $(T_g - T_c)$ remain unchanged. As soon as the equilibrium with the reduced power demand of the energy consumer or converter 8, has been re-established, valve 17 again fully opens, connecting the exit of the compressor 1 with the air conduit 11, re-establishing a continuous flow of fresh, renovating air into the principal cycle $e, f, g, c$, at a new and lower pressure $p_1$ but at constant compression ratio $p_2/p_1$ for the duration of the new load demand on the principal machine set.

Regardless in which direction the external power of the dual cycle has to be varied, either being increased or being decreased, as soon as the short time period of adjustment has been passed, the balancing machine set 1, 3, 4, settles down to a uniform speed of rotation either faster or slower than before, but nevertheless constant for a given condition of equilibrium, until the next load regulating signal may be received.

Closer study of the functioning of the balancing machine set 1, 3, 4, reveals that at all times except when accelerating, this machine will produce useful electrical energy in the electric machine 4, principally due to two favorable reasons, one of which being a slightly greater mass of gases flowing through the balancing turbine 3 than the amount of mass of fresh air which is being replenished by the balancing compressor 1. This comes about due to the presence of constituents of the burned fuel in the mass of the turbine gases, causing a slightly higher torque on the turbine shaft. The second and the main reason, is that the heat drop in the turbine 3, defined by the temperature difference $(T_c - T_d)$ at a higher temperature level, is always greater than the heat rise in the compressor 1, defined by the temperature difference $(T_b - T_a)$ at a lower temperature level, this being due to the physical properties of the air.

The balancing of loads on the principal machine set 6, 7, 8, and the regulating procedure are, therefore, extremely simple and rapid, due to the smallness and due also to the relatively low inertia of the balancing machine set 1, 3, 4, and also due, in no small measure, to the functioning of the closing-off and by-passing operations of valves 17 and 18. It is not necessary therefore, to employ an accumulating air receiver for fresh air or a gas discharge valve to the atmosphere to speed up regulation; obviously, by the load balancing procedure implied in our invention, no energy of gases is wasted, as might be the case with blow-off valves. It is well also to remember that the regulation of continuous combustion turbo plants is inherently easier than of steam turbines, because of the basic compressor load maintained by the combustion turbine and constituting a major portion of the total turbine output, which is always present under any external load demand, and also because of the simple continuity with which regulation can be practiced by the control of the fuel supply, contrasted with the usual step regulation common in the steam turbines. However, should there arise a special case of the dual cycle application requiring sensitive balancing of extremely sharp and large load surges on the energy converter 8, the invention can be extended further, to include a parallel, secondary regulating or balancing machine as is shown in Fig. 3.

Referring to Fig. 3, it discloses two balancing machines 1, 3, 4 and 1', 2', 3' connected in parallel. By splitting the balancing machine into two smaller and identical units, of one half the size of the principal unit, the mass moment of inertia of the rotors may be assumed to be diminished approximately sixteen times, indicating for the same speed of rotation, a kinetic flywheel effect sixteen times smaller than before and a correspondingly increased sensitivity to accelerating and decelerating impulses. The dual balancing sets 1, 3, 4, and 1', 3', 4', obtain the propulsive mixtures of hot air and burned gases from a common close-off valve 18 and by way of example, each turbine 3 and 3' receives one half of the mass flow of gases from conduit 12 and each compressor 1 and 1' delivers one half of the fresh replenishing air through the by-pass valve 17 into conduit 11 and through it to the low pressure side of the principal cycle conduit.

The functioning of the two small balancing sets operating in parallel is analogous to the method described before for the cycle with only one balancing set; with the exception that the smaller machines, being considerably more responsive to speed variation impulses, will rapidly answer any load variation signals.

The invention also provides for a novel method of starting of continuous combustion gas turbines by means already contained in the dual cycle arrangement for normal operation. The starting of the principal set 6, 7, 8, from standstill is accomplished according to configuration shown in Fig. 2, by the complete closure of the gas release conduit 12 by valve 18, preventing any outflow of gases from the conduit 12 and from the principal cycle circuit to the balancing turbine 3 and thereupon to the atmosphere. Simultaneously, air conduit 11 is closed off by the valve 19 and the air flow from compressor 1 is directed by said valve into the conduit 16, entering the high pressure side of the principal cycle at point $f$, immediately before the heat generator, although another point of entry, e. g., after the heat generator, could be selected on the high pressure side of the principal cycle circuit and it is not, therefore, intended to limit our specification to the singular connection shown in the figures.

The electric machine 4 is run up, driving the balancing set compressor 1 and turbine 3 which as an idling machine without contributing to the driving torque due to the closure of valve 18. The compressor 1 draws fresh air from the atmosphere and after compressing it, drives with it the principal turbine 7 of the principal machine set 6, 7, 8. The turbine 7 begins to accelerate under the increasing pressure of flow of air from the compressor 1. The air driving the turbine 7 is ducted through the heat exchanger 10 to the high pressure compressor 6, wherein it is again re-compressed, ducted to the combustion heat generator 2 and back to the point $g$; when the predetermined pressure at point $f$, has been reached, fuel is caused to be introduced into the heat generator 2 and ignited, thereby commencing combustion and a further acceleration of the principal turbine 7, gradually reaching the condition of autorotation of the principal machine set 6, 7, 8. The principal machine set henceforth operates under its own power, the starting process having been thereby accomplished and the valves 18 and 19 are automatically caused to be reset by gas pressure at point $f$, and by means not essential to this specification but disclosed in copending application Serial No. 301,224, into their normal operating positions, allowing fresh air to enter the principal cycle $e, f, g, c$, on the low pressure isobar and letting the purging mixture of air and gases pass through the balancing turbine 3 to the atmosphere.

Fig. 4 discloses an arrangement in which two auxiliary sets 1—3—4 and 1'—3'—4' are connected in series. This permits the operation of the main set 6—7—8 at higher pressure than in the preceding cases, thus reducing its specific weight. The intermediate machine set 1', 3', 4', may operate either at constant speed or at a variable speed and it may be constructed in various size relationships with respect to the principal machine set 6, 7, 8. The intermediate machine set 1', 3', 4', receives compressed air from the balancing set 1, 3, 4, by conduit 11', re-compresses it and supplies it by conduit 11 to the principal cycle circuit 6, 2, 7, 10. Since with the high compression turbo machines described in the copending applications 557,655; 179,028; and 228,166, identified more fully before, referenced already hereinabove, it is possible to reach compression ratios of 10:1 in one rotor, it will be apparent that the principal machine set 6, 7, 8, can operate with pressures of the order of up to 100 atmospheres, making possible the realization of the greatest economically desirable outputs in very small turbo machines.

The dual cycle with an intermediate machine set can be extended also into its general configuration indicated in Fig. 4 by interrupted lines, including an intermediate cycle heat generator 2' and an intermediate cooling heat exchanger 10' thereby completing the intermediate cycle circuit comprising machines and apparatus 1', 2', 3', 10', operating either to constant or variable temperature and therefore, according to the laws of dynamic similarity also at either constant or variable speed of rotation, according to the choice determined by the operational preferences. It will be apparent to those skilled in thermodynamics that a further extension or pyramiding of additional intermediate cycles, all operating in series and in addition, if so desired, in combination with machines operating in parallel.

Since the principal object of this invention is to maintain high and constant thermal efficiency of gas turbines at variable load demand, the specification stresses the constancy of the rotational speed of the principal cycle. However, the disclosed cycle can be practiced also with the principal machine set 6, 7, 8, operating at variable speed, either in synchronism with the load demand or independent of it. According to the laws of dynamic similarity, the speed of rotation of a turbine and of a compressor is proportional to the square root of the absolute temperature ratio, (input temperature divided by output temperature) respectively, the speed variation on the principal machine set 6, 7, 8, requiring therefore, variation of temperature $T_g$ in the heat generator 2 of the principal cycle circuit.

Although this operational method can be realized in conventional gas turbines as well, it is limited there to the variation of speed as a function of the load demand only. According to this invention, the speed of the principal machine set 6, 7, 8, can be varied independently of the load demand, in fact the variation can be actually opposite in character. Thus by way of example, the principal machine set 6, 7, 8, can be speeded up by the increase of temperature $T_g$ in the heat generator 2, thereby increasing also the net output of the principal machine set as in a conventional gas turbine; or the density of the motive elastic fluid in the principal cycle circuit 6, 2, 7, 10, can be decreased by slowing down the balancing machine set 1, 3, 4, while the temperature in the heat generator 2 is increased, thereby either maintaining constant power output on power consumer 8 with increased speed or even a decreased power output on said power consumer with increased speed. These operational features and advantages are inherently characteristic of the disclosed cycle and are especially sought after in transportation propulsion, e. g., for locomotive drives using mechanical transmissions, making possible attainment of high torques at low speeds and conversely, of low torques at high speeds, neither one of these characteristics having as yet been realized by any known turbine prime movers.

What is claimed is:

1. The method of increasing the rate of flow of a working fluid through a first and principal compressor-turbine set in response to an increase in a load connected to said first set from a first, small load to a second greater load, by increasing the mass-density of the fluid furnished to said first set by a compressor of a second, balancing compressor-turbine-electric machine set, said method including the steps of, as long as said first load remains constant, precompressing said fluid in said second compressor to a pressure $p_1$; conveying the precompressed fluid to said first compressor; compressing, in said first compressor, said precompressed fluid from pressure $p_1$ to pressure $p_2$ for obtaining a compressed fluid; mixing and burning fuel in said compressed fluid for producing an exothermic gaseous reaction thereby producing the products of combustion having a temperature $T_g$ and pressure $p_2$, expanding said products of combustion through said first turbine to a pressure not lower than $p_1$; expanding from 40% to 15% of the exhaust gases leaving said first turbine still further through said second turbine; driving said second compressor and said machine as a generator from said second turbine; cooling and then mixing the remaining 60% to 85% of said exhaust gases with said precompressed fluid; conveying the mixture of the precompressed fluid and exhaust gases to the input of said first compressor; and increasing the mass-density of the fluid, of the products of combustion and of the exhaust gases, respectively, flowing through said first and second sets, in response to an increase in said first load to said second load by first operating said electric machine as a motor at a higher speed than the prior speed of said machine when operated as a generator during said first load, thereby accelerating said second compressor for compressing said fluid to a higher pressure $p_1'$; increasing the amount of the fuel supplied for said exothermic reaction to the extent necessary for maintaining the temperature $T_g$ constant; returning all the exhaust gases to the input of said first compressor during the transition period from the first load to the second load; mixing the precompressed fluid and the exhaust gases prior to their entry into said first compressor; compressing the mixed fluid and the exhaust gases from pressure $p_1'$ to pressure $p_2'$ with the compression ratio of said first compressor remaining constant; and, upon establishing the power equilibrium between said second load and the power delivered by said first turbine, redirecting the 60% to 85% of the exhaust gases back to said first compressor, and 40% to 15% of the exhaust gases to said second turbine while maintaining said compression ratio of the first compressor constant; whereby said second turbine again drives said second compressor and said electric machine as a generator as long as the increased load remains constant.

2. The method as defined in claim 1 which also includes the steps of stopping the flow of the precompressed fluid from said second compressor to said first compressor during the transition period from the second load to a decreased load, and restoring said flow upon establishing the power equilibrium between the decreased load and the power produced by said first turbine; decreasing the amount of fuel to maintain temperature $T_g$ constant, and reducing the compression ratio of the second compressor in proportion to the decrease in said load by reducing its angular velocity while maintaining the compression ratio of the first compressor substantially constant.

3. The method of varying the rate of flow of a working fluid through a first and principal compressor-turbine set in response to a variation in a load connected to said first set by varying the mass-density of the fluid furnished to said first set by a compressor of a second, balancing compressor-turbine-electric machine set, said method including the steps of precompressing said fluid in said second compressor to a pressure $p_1'$; conveying the precompressed fluid to said first compressor; compressing, in said first compressor, said precompressed fluid from pressure $p_1'$ to pressure $p_2'$ for obtaining a compressed fluid; mixing and burning fuel in said compressed fluid for producing an exothermic gaseous reaction, thereby producing the products of combustion having a temperature $T_g$ and pressure $p_2'$; expanding said products of combustion through said first turbine to a pressure not lower than $p_1'$; expanding from 40% to 15% of the exhaust gases leaving said first turbine still further through said second turbine as long as said load remains substantially constant; driving said second compressor and said machine as a generator from said second turbine; cooling and then returning the remaining 60% to 85% of said exhaust gases to the input of said first compressor; and decreasing the mass-density of the fluid, products of combustion and exhaust gases, flowing, respectively, through said first and second sets, in response to a decrease in said load by first reducing the amount of the fuel supplied for said exothermic reaction; discharging the fluid output of said second compressor into an ambient fluid during the transition period from the original load to the decreased load until $p_1'$ is decreased to $p_1$ and $p_2'$ is decreased to $p_2$, said decrease in the pressures being a function of the decrease in said load; and then redirecting the flow of the precompressed fluid from said second compressor to said first compressor for the duration of the decreased load.

4. The method as defined in claim 3, which also includes the step of decreasing the amount of the fuel supplied for said exothermic reaction only to the extent necessary for maintaining $T_g$ constant.

5. The method of varying the rate of flow of a working fluid through a first and principal compressor-turbine set in response to a variation in a load connected to said first set by varying the mass-density of the fluid furnished to said first set by a compressor of a second, balancing compressor-turbine set, said method including the steps of precompressing said fluid in said second compressor to a pressure $p_1$; conveying the precompressed fluid to said first compressor; compressing, in said first compressor, said precompressed fluid from pressure $p_1$ to a pressure $p_2$ for obtaining a compressed fluid; mixing and burning fuel in said compressed fluid for producing an exothermic gaseous reaction, thereby producing the products of combustion having a temperature $T_g$ and pressure $p_2$; expanding said products of combustion through said first turbine to a pressure not lower than $p_1$; expanding, at least that portion of the exhaust gases which is necessary for maintaining stoichiometric combustion of said fuel within said compressed fluid, still further through said second turbine as long as said load remains constant; cooling and then returning the remaining major portion of said exhaust gases to the input of said first compressor; and increasing the mass-density of the fluid and of the products of combustion in response to an increase in the load connected to said first turbine by first increasing the amount of fuel furnished for said exothermic reaction for maintaining $T_g$ constant; removing, during the transition period from the lighter load to the heavier load, the external load carried by said second turbine; furnishing an external power, other than said second turbine, for driving said second compressor at a higher speed than its speed at the lighter load, said increase in speed increasing pressure $p_1$ to $p_1'$; raising pressure $p_2$ to $p_2'$ by directing, during said transition period, the entire exhaust gases to the input of said second compressor and by increasing the input pressure into the second compressor from $p_1$ to $p_1'$; and, upon establishing the power equilibrium between the increased load and the power delivered by said first turbine, redirecting the flow of the same at least stoichiometric portion of the exhaust gases to said second turbine for restoring the function of said second turbine as a prime mover for said second compressor and said external load.

6. The method of varying the rate of flow of a working fluid through a first compressor-turbine set in response to a variation in a load connected to said first set by varying the mass-density of the fluid furnished to said first set by a compressor of a second, balancing compressor-turbine set, said method including the steps of precompressing said fluid in said second compressor; conveying the precompressed fluid to said first compressor; compressing said precompressed fluid in said first compressor for obtaining a compressed fluid; mixing and burning fuel in said compressed fluid for producing an exothermic gaseous reaction with the products of combustion having a temperature $T_g$; expanding said products of combustion through said first turbine for driving said first turbine at constant angular velocity; expanding from 40% to 15% of the exhaust gases, leaving said first turbine, still further through said second turbine; driving said second compressor from said second turbine; cooling and then, as long as said load remains constant, returning the remaining portion of said exhaust gases to the input of said first compressor by first mixing said remaining exhaust gases with the compressed fluid leaving said first compressor; and increasing the mass-density of the products of combustion, flowing through said first turbine by momentarily stopping the flow of the exhaust gases to said second turbine during the transition period from the smaller load to a larger load, and directing all exhaust gases to said first compressor; increasing the amount of the fuel for said exothermic reaction for maintaining $T_g$ constant; driving said second compressor from an external source of power at a greater speed than its speed during the smaller load until said greater speed and the increased amount of fuel create a mass-density of the products of combustion to drive said first turbine at said constant angular velocity in spite of the increase in said load, and then again restoring the flow of the same 40% to 15% portion of said exhaust gases to said second turbine for driving said second compressor again from said second turbine.

7. The method as defined in claim 6 which also includes the steps of discharging the precompressed fluid into an ambient fluid and reducing the amount of fuel for said exothermic reaction during the transition period from said larger load to said smaller load, and then again discharging said precompressed fluid and said exhaust gases into said first compressor upon reduction of the mass-density of the products of combustion, flowing through said first turbine, to a lower level, corresponding to the reduction in said load.

8. A method of starting a first compressor-turbine set with the aid of a compressor of a second compressor-turbine set, said first and second compressors, and said first turbine, being connected to a combustion heat generator, said method including the steps of applying an external power to said second set for driving said second set, precompressing an ambient fluid in said second compressor, discharging the entire precompressed fluid directly into said combustion heat generator, feeding into and burning fuel within said pre-compressed fluid in said combustion heat generator for producing products of combustion, discharging all of said products of combustion into said first turbine, expanding all of said products of combustion through said first turbine whereby said products of combustion appear as exhaust gases on the output side of said first turbine, cooling all of said exhaust gases and then conveying all of the cooled exhaust gases to the input side of said first compressor, recompressing the cooled exhaust gases in said first compressor while driving it from said first turbine, and discharging the recompressed exhaust gases from said first compressor directly back to said combustion heat generator.

9. The method as defined in claim 8, which, upon resumption of a normal speed by said first set, also includes the steps of discharging the entire precompressed fluid into the input side of said first compressor, discharging from 30% to 15% of the exhaust gases to the input side of said second turbine for normally driving said second compressor from said turbine, and discharging the remaining 70% to 85% of the exhaust gases to the input side of said first compressor.

10. The method of operating a first compressor-turbine set with the aid of a second compressor-turbine set and a combustion heat generator interconnecting the compressor and the turbine of the first set, said method including the steps of driving said second compressor from said second turbine for precompressing an ambient fluid from pressure $p_0$ to pressure $p_1$, conveying the precompressed fluid to said first compressor and compressing it to pressure $p_2$, discharging said compressed fluid into said combustion heat generator, feeding into and burning fuel within said compressed fluid, thereby producing products of combustion, expanding said products through said first turbine for driving said first compressor and an external load, said products of combustion appearing as exhaust gases at the exhaust side of said first turbine, expanding still further a first portion of the exhaust gases through said second turbine for driving said second compressor, cooling and then combining and mixing the second and remaining portion of the exhaust gases with said precompressed fluid, whereby said first compressor receives mixed gases containing said compressed fluid and said remaining portion of said exhaust gases, and shifting the operation of said first set to a higher pressure cycle with the increase in said load by increasing $p_1$ to $p_1'$ and to $p_2'$, while maintaining the compression ratio $$\frac{p_1}{p_2} \text{ equal to } \frac{p_1'}{p_2'}$$

by increasing the angular speed of said second compressor, increasing the amount of fuel to the extent required for maintaining the temperature of said products of combustion constant irrespective of the change in said load, and by increasing the second portion of the exhaust gases discharged into said precompressed fluid only during the transition period from the previous load to the increased load, said increase being a function of the increase in said load, and of the rate of increase in said load, the maximum of said second portion being 100% of said exhaust gases.

11. The method as defined in claim 10 which also includes the step of returning the operation of said second set to a lower pressure cycle by discharging a portion of the output of said second compressor into an ambient fluid during the transition period from a large external load to a small external load, the discharged portion being a function of the decrease in said load, and the rate of decrease of said load, the maximum of said portion being 100% of said precompressed fluid.

VLADIMIR H. PAVLECKA.
FREDERICK DALLENBACH.

REFERENCES CITED

The following references are of record in the file of this patent:

UNITED STATES PATENTS

| Number | Name | Date |
|---|---|---|
| 1,766,886 | Elling | June 24, 1930 |
| 2,095,991 | Lyholm | Oct. 19, 1937 |
| 2,172,910 | Keller | Sept. 12, 1939 |
| 2,245,954 | Anxionnaz | June 17, 1941 |
| 2,268,270 | Traupel | Dec. 30, 1941 |
| 2,298,663 | Traupel | Oct. 13, 1942 |
| 2,303,381 | New | Dec. 1, 1942 |
| 2,318,905 | Traupel | May 11, 1943 |
| 2,365,551 | Hermitte | Dec. 19, 1944 |
| 2,407,166 | Kreitner | Sept. 3, 1946 |

FOREIGN PATENTS

| Number | Country | Date |
|---|---|---|
| 228,290 | Switzerland | Nov. 16, 1943 |
| 378,229 | Italy | Jan. 25, 1940 |